(12) United States Patent
Matsuyuki et al.

(10) Patent No.: US 9,790,126 B2
(45) Date of Patent: *Oct. 17, 2017

(54) OPAQUE COLOR STACK FOR ELECTRONIC DEVICE

(71) Applicant: Apple Inc., Cupertino, CA (US)

(72) Inventors: Naoto Matsuyuki, Aichi (JP); Douglas J. Weber, Arcadia, CA (US)

(73) Assignee: Apple Inc., Cupertino, CA (US)

(*) Notice: Subject to any disclaimer, the term of this patent is extended or adjusted under 35 U.S.C. 154(b) by 128 days.

This patent is subject to a terminal disclaimer.

(21) Appl. No.: 14/019,526

(22) Filed: Sep. 5, 2013

(65) Prior Publication Data

US 2015/0064432 A1 Mar. 5, 2015

(51) Int. Cl.
*G06F 1/16* (2006.01)
*C03C 17/34* (2006.01)
*G02B 1/115* (2015.01)
*G06F 3/044* (2006.01)
*C03C 17/36* (2006.01)

(52) U.S. Cl.
CPC ...... *C03C 17/3411* (2013.01); *C03C 17/3417* (2013.01); *C03C 17/3435* (2013.01); *C03C 17/3639* (2013.01); *C03C 17/3684* (2013.01); *G02B 1/115* (2013.01); *G06F 3/044* (2013.01); *C03C 2217/72* (2013.01); *G06F 2203/04103* (2013.01); *Y10T 156/10* (2015.01); *Y10T 428/24942* (2015.01); *Y10T 428/24975* (2015.01)

(58) Field of Classification Search
CPC ............ C03C 17/3411; C03C 17/3417; C03C 17/3639; C03C 17/3435; C03C 2217/72; G02B 1/115; G02B 26/001; G02B 5/285; G06F 1/1601; G06F 3/044
See application file for complete search history.

(56) References Cited

U.S. PATENT DOCUMENTS 1,608,108 A 11/1926 Martus et al.
2,473,848 A 8/1947 Baxter
(Continued)

FOREIGN PATENT DOCUMENTS

CN 201945987 8/2011
CN 102725663 10/2012
(Continued)

OTHER PUBLICATIONS

Jaeger, "Color Solid Ink Printing," imaging.org, 4 pages, at least as early as Sep. 23, 2014.

*Primary Examiner* — Aaron Austin
*Assistant Examiner* — Michael Zhang
(74) *Attorney, Agent, or Firm* — Kendall W. Abbasi

(57) ABSTRACT

An opaque cover for a capacitive sensor is provided. The cover includes a transparent substrate and a black color stack disposed adjacent the transparent substrate. The black color stack includes a pigment stack having a first dielectric layer, a second dielectric layer, and a first light absorbing layer positioned between the first and second dielectric layers. The first dielectric layer has a first refractive index. The second dielectric layer has a second refractive index different from the first refractive index. The black color stack also includes a plurality of second light absorption layers interleaved with a plurality of third dielectric layers.

28 Claims, 12 Drawing Sheets

(56) References Cited

U.S. PATENT DOCUMENTS

| | | | |
|---|---|---|---|
| 2,821,589 A | 1/1958 | Needham | |
| 3,123,792 A | 3/1964 | Klemm | |
| 3,471,663 A | 10/1969 | Farrell | |
| 4,227,059 A | 10/1980 | Ogawa | |
| 4,340,791 A | 7/1982 | Sorenson | |
| 5,180,051 A | 1/1993 | Cook et al. | |
| 5,214,530 A * | 5/1993 | Coombs et al. | 359/359 |
| 5,327,201 A | 7/1994 | Coleman et al. | |
| 5,496,977 A | 3/1996 | Date et al. | |
| 5,523,125 A | 6/1996 | Kennedy et al. | |
| 5,718,326 A | 2/1998 | Larose et al. | |
| 5,936,213 A | 8/1999 | Biquez et al. | |
| 6,040,543 A | 3/2000 | Mina et al. | |
| 6,084,190 A | 7/2000 | Kenmochi | |
| 6,201,196 B1 | 3/2001 | Wergen | |
| 6,565,770 B1 * | 5/2003 | Mayer et al. | 252/301.36 |
| 6,591,457 B1 | 7/2003 | Howie, Jr. | |
| 6,630,635 B1 | 10/2003 | Doepner | |
| 6,667,450 B2 | 12/2003 | Bulin et al. | |
| 6,707,358 B1 | 3/2004 | Massman | |
| 6,762,381 B2 | 7/2004 | Kunthady et al. | |
| 7,101,603 B2 | 9/2006 | Okamura et al. | |
| 7,165,846 B2 | 1/2007 | Sannohe | |
| 7,297,221 B2 | 11/2007 | Hikita | |
| 7,414,213 B2 | 8/2008 | Hwang et al. | |
| 7,531,765 B2 | 5/2009 | Komagata | |
| 7,727,618 B2 | 6/2010 | Iwano | |
| 8,003,200 B2 | 8/2011 | Nashiki et al. | |
| 8,222,773 B2 | 7/2012 | De Iuliis et al. | |
| 8,232,502 B2 | 7/2012 | Young et al. | |
| 8,529,775 B2 | 9/2013 | Costin et al. | |
| 8,640,413 B2 | 2/2014 | Ruggie et al. | |
| 8,802,220 B2 | 8/2014 | Cao et al. | |
| 8,867,320 B2 | 10/2014 | Suzuki et al. | |
| 8,882,280 B2 | 11/2014 | Fukaya et al. | |
| 2005/0287301 A1 | 12/2005 | Ljubomirsky | |
| 2006/0024476 A1 | 2/2006 | Leland et al. | |
| 2009/0237782 A1 | 9/2009 | Takamatsu et al. | |
| 2010/0026656 A1 * | 2/2010 | Hotelling et al. | 345/174 |
| 2011/0109590 A1 | 5/2011 | Park et al. | |
| 2011/0177300 A1 * | 7/2011 | Hankey et al. | 428/189 |
| 2012/0103778 A1 * | 5/2012 | Obata | G06F 3/044 200/600 |
| 2013/0084430 A1 | 4/2013 | Hill et al. | |
| 2013/0098191 A1 | 4/2013 | Manullang et al. | |
| 2013/0112536 A1 | 5/2013 | Shah et al. | |
| 2013/0120314 A1 | 5/2013 | Ishibashi et al. | |
| 2013/0140746 A1 | 6/2013 | Heverly et al. | |
| 2013/0154959 A1 | 6/2013 | Lindsay et al. | |
| 2013/0100039 A1 | 8/2013 | Hong et al. | |
| 2014/0363608 A1 | 12/2014 | Russell-Clarke et al. | |
| 2015/0062709 A1 * | 3/2015 | Matsuyuki | C03C 17/3417 359/584 |

FOREIGN PATENT DOCUMENTS

| | | |
|---|---|---|
| CN | 202632259 | 12/2012 |
| CN | 202649955 | 1/2013 |
| CN | 202854790 | 4/2013 |
| CN | 103250120 A | 8/2013 |
| CN | 203366304 | 12/2013 |
| CN | 103902122 | 7/2014 |
| CN | 204242152 | 4/2015 |
| DE | 102010006665 | 8/2011 |
| EP | 0424173 | 4/1991 |
| GB | 581824 | 10/1946 |
| GB | 957644 | 5/1964 |
| JP | H0593811 | 4/1993 |
| JP | 2008052062 A | 3/2008 |
| JP | 2008268569 A | 11/2008 |
| JP | 2010182472 A | 8/2010 |
| JP | 2010211790 A | 9/2010 |
| JP | 201263839 | 3/2012 |
| JP | 2012226688 A | 11/2012 |
| JP | 2013057928 A | 3/2013 |
| JP | 2013515285 A | 5/2013 |
| JP | 2013145447 A | 7/2013 |
| JP | 2013152639 A | 8/2013 |
| JP | 201410814 | 1/2014 |
| KR | 1020090131944 | 4/2010 |
| TW | M414616 | 10/2011 |
| TW | 201231792 | 8/2012 |
| WO | 9812583 | 3/1998 |
| WO | WO01/34408 | 5/2001 |
| WO | 2009126585 | 10/2009 |
| WO | WO2011/076294 | 6/2011 |
| WO | 2012053818 A | 4/2012 |
| WO | 2012134173 A | 10/2012 |
| WO | 2013097631 A | 7/2013 |

* cited by examiner

OPAQUE COLOR STACK FOR ELECTRONIC DEVICE

TECHNICAL FIELD

Embodiments described herein generally relate to a coloring for an ink layer of an electronic device. More specifically, embodiments relate to a thin, opaque, non-conductive black coloring for an electronic device that may permit operation of a capacitive sensor therethrough

BACKGROUND

Many portable digital devices incorporate at least one display screen to provide graphical information to a user or viewer. The display screen may include a liquid crystal display (LCD). Such devices may also include one or more sensors located beneath a cover glass that overlies, and typically extends beyond, the LCD. As one example, these sensors may be capacitive sensors.

The devices may also incorporate an opaque region, such as black coating region, outside the display screen (e.g., outside the active display region) but beneath the cover glass. The opaque region may include opaque ink like black ink under a cover glass or sapphire. The devices may also incorporate a button, which is one non-limiting and non-exclusive way to permit a user to provide input to the device. When the button is implemented as or incorporating a mechanical switch, it is often located within the opaque region. The same may be true when the button is a "soft" button, e.g., is a non-moving element that senses a touch and/or force exerted on a surface of the soft button.

A sensor, such as a capacitive fingerprint or touch sensor, may be positioned under the button. Generally, the black ink should to be thin enough to make the sensor sensitive, but also optically opaque to conceal the sensor and match the coloring of the opaque region.

A black ink having these properties may include a high percentage of carbon pigments, such as carbon black, to obtain adequate optical density. However, carbon pigments typically are conductive, which may affect the operation of a capacitive sensor located beneath the ink layer. Further, the relative thickness of the ink layer may increase the distance between the sensor and an object it attempts to sense, such as a finger atop the button. Generally, the sensitivity of a capacitive sensor varies inversely with the square of the distance between the sensor and sensed object, so relatively small changes in distance may have large effects on sensor performance. Additionally, particles, voids, and contamination in the black ink or paints may affect the performance of the sensor and cause functional errors in sensor readings. These issues increase as the thickness of the ink layer used to color the button increases. Therefore, a thinner, non-conductive (or less conductive) black ink may be useful.

SUMMARY

Embodiments described herein may provide a thin opaque non-conductive black color stack that makes a highly sensitive sensor, such as a capacitive sensor, underneath a cover substrate invisible. The sensor may provide a clean signal when the cover substrate, such as a cover glass or sapphire, is touched. The thin non-conductive black color stack is positioned between the cover substrate and the capacitive sensor. The non-conductive black color stack may include a non-conductive light-absorbing stack, which includes a relatively thin layer of a light absorbing material, such as tin, and a relatively thick layer of dielectric material, such as silicon nitride or silicon oxide. The tin layer is kept under 100 nm thick in order to be non-conductive. The non-conductive black color stack may also include a top pigment stack, which includes two different dielectric layers sandwiched with a light absorbing layer, such as a tin layer.

The black color stack is non-conductive with a resistivity of at least $10^{14}$ Ωcm and has a relatively low dielectric constant compared to that of certain types of black ink, such as certain inks using carbon as a pigment. The high resistivity and relatively low dielectric constant of the black color stack help improve the performance of the capacitive sensor. The black color stack is thin enough to allow the capacitive sensor to sense finger touching on the cover glass, while the black color stack still has the optical density of at least 3 or greater to be optically opaque to make the capacitive sensor underneath invisible.

In one embodiment, an opaque cover for a capacitive sensor is provided. The cover includes a transparent substrate and a black color stack disposed adjacent the transparent substrate. The black color stack includes a pigment stack having a first dielectric layer, a second dielectric layer, and a first light absorbing layer positioned between the first and second dielectric layers. The first dielectric layer has a first refractive index. The second dielectric layer has a second refractive index different from the first refractive index. The black color stack also includes a plurality of second light absorption layers interleaved with a plurality of third dielectric layers.

In another embodiment, a method is provided for forming a black color stack over a substrate. The method includes depositing a pigment stack over a transparent substrate. The pigment stack includes a first dielectric layer separated from a second dielectric layer by a first light absorbing layer, the first dielectric layer and the second dielectric layer having different refractive indexes. The method also includes depositing a non-conductive light-absorbing stack over the pigment stack, and positioning a capacitive sensor adjacent to the light-absorbing stack.

Additional embodiments and features are set forth in part in the description that follows, and in part will become apparent to those skilled in the art upon examination of the specification or may be learned by the practice of the embodiments discussed herein. A further understanding of the nature and advantages of certain embodiments may be realized by reference to the remaining portions of the specification and the drawings, which forms a part of this disclosure.

DETAILED DESCRIPTION

Figure 1:
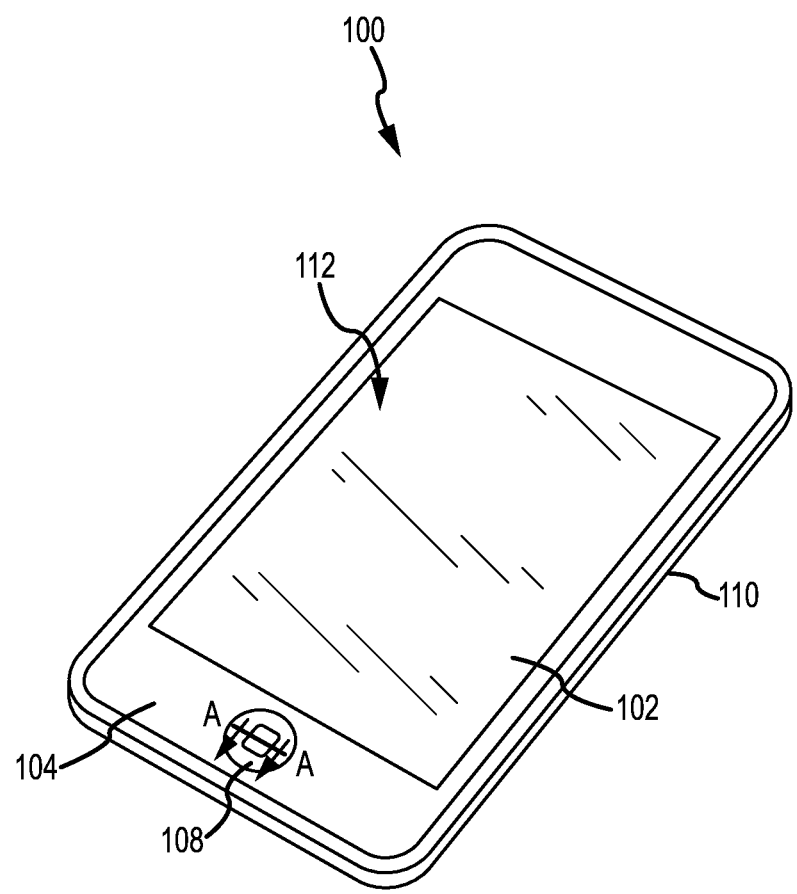
FIG. 1 illustrates a perspective view of an electronic device in accordance with embodiments of the present disclosure.

The present disclosure may be understood by reference to the following detailed description, taken in conjunction with the drawings as described below. It is noted that, for purposes of illustrative clarity, certain elements in various drawings may not be drawn to scale, may be represented schematically or conceptually, or otherwise may not correspond exactly to certain physical configurations of embodiments.

The disclosure discusses a non-conductive black color stack that may be positioned between a transparent cover or substrate, such as sapphire or glass substrate, and a sensor, such as a capacitive sensor, and through which the sensor may operate to sense an element position on the substrate. The black color stack generally is positioned under the transparent cover, and makes the capacitive sensor invisible. The black color stack may include a pigment stack and an adjacent non-conductive light-absorbing stack.

The pigment stack may include a first dielectric layer separated from a second dielectric layer by a light-absorbing layer. The first dielectric layer generally has a different refractive index from the second dielectric layer. For example, $SiO_2$ has a different refractive index from that of $Nb_2O_5$ or $Si_3N_4$. The pigment stack may adjust or tune its black color to any desired or useful shade of black. As one example, by varying the materials and/or thicknesses for the two different dielectric layers, the black color may be varied or tuned slightly, for example, to produce a yellowish black, bluish black, or green black color. In addition to using materials that have varying refractive indexes, the thicknesses of the various layers may affect wavelengths of light absorption.

The light-absorbing stack absorbs at least a portion of incident light that passes through the cover glass. The light-absorbing stack may include a light absorbing material, such as tin, which has high light absorption. In some embodiments tin may be replaced by copper oxide (CuO) or zinc oxide (ZnO) or another light absorption layer which is less conductive than carbon fibers used in standard black pigments.

The non-conductive light-absorbing stack may also include dielectric materials. Specifically, the non-conductive light-absorbing stack may include dielectric layers (e.g., $Si_3N_4$, $SiO_2$, or $Nb_2O_5$) interleaved with light absorbing layers (e.g., tin, CuO, or ZnO).

Each of $SiO_2$, $Si_3N_4$, and $Nb_2O_5$ has a relatively low dielectric constant compared to the dielectric constant of certain type of black ink, such as certain carbon-based inks having high dielectric constants. Since titanium oxide has a high dielectric constant, it acts to insulate a sensed element touching or adjacent the substrate (such as the cover glass) from the capacitive sensor. Thus, alternative materials may be used to impart color in applications or embodiments where the colored ink overlies the sensor, or is otherwise positioned between the sensor and the sensed element.

The black color stack may be made as thin as 1 μm to 2 μm in certain embodiments, which may permit the sensor to capacitively couple through the ink layer to the sensed element.

FIG. 1 illustrates a perspective view of an electronic device in accordance with embodiments of the present disclosure. Electronic device 100 may include a display 102 on a surface, such as a top surface, to display information to users. In some embodiments, the display may be touch-sensitive.

The display may incorporate liquid crystal display (LCD) technology, which is one of the most widely used display technologies. An LCD generally includes a backlight module, such as a light emitting diode (LED), a bottom polarizer, a TFT glass, a liquid crystal layer, a color filter glass, and a front polarizer. The display may also utilize organic light emitting diodes (OLED), plasma technology, and the like in lieu of the LCD and/or backlight.

Electronic device 100 may be any of a variety of devices, most of which employ a hard substrate as a cover glass/window. For example, the electronic device may be a mobile phone, tablet computer, laptop computer, instrument window, appliance screen and the like. It should be appreciated that the cover glass may be soft and somewhat flexible instead of hard and/or rigid, as in the case of certain laptop computers.

Electronic device 100 may include the aforementioned cover glass 112, which covers the display 102 and, typically, an opaque region 104 surrounding or adjacent the display 102. In the opaque region, the cover glass 112 is partially printed with an opaque coating, such as a white coating or a black coating, or otherwise has such a coating applied thereto. Cover glass 112 may be a transparent or may have a transparent portion to permit a user to view the display 102. For example, the cover glass 112 may be made fully or partially from sapphire, glass (which may be chemically treated), certain plastics, certain polymers, and the like.

The opaque region 104 typically is positioned outside the display 102 or the active region of the display, although this is not necessary. In some embodiments, a button or other input mechanism may be positioned in the opaque region 104. The button 108 may act as an input mechanism to control certain operations of the electronic device, or to provide input to the electronic device. One or more capacitive sensors or sensing elements may be located underneath the button 108. An opaque ink layer and/or adhesive may be placed between the bottom surface of the button 108 and the top surface of the sensor. The adhesive may bond the sensor to the button, while the ink layer may color the button. The ink layer may color the button to match the opaque region 104, for example. Both the button and the opaque region 104 may be white, black or any other color.

One sample sensor may sense a finger touching or nearly touching the button 108 through a change in capacitance at the sensor or its constituent elements (if there are multiple sensing elements). When the electronic device capacitively senses a touch on the button, for example, the device may activate certain functions associated with the capacitive sensor. As one example, the sensor may be a fingerprint sensor and may operate to capture a fingerprint when a touch is sensed.

Top cover glass 112 is supported by a housing 110. The housing 110 may be formed of a variety of different materials including, but not limited to, polymer materials (e.g. plastics), metals (e.g. aluminum, steel, titanium, alloys, and the like), amorphous glass materials, composite materials, and combinations thereof.

Figure 2:
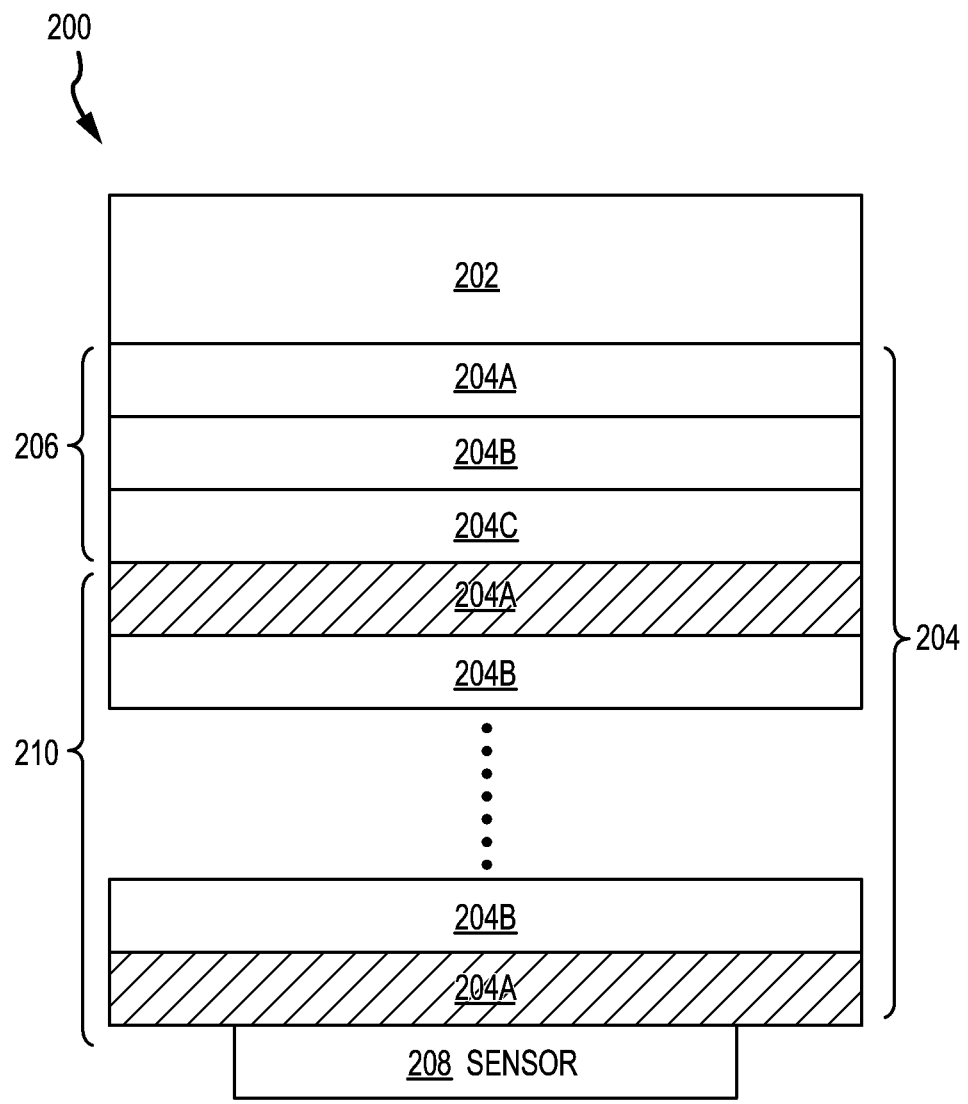
FIG. 2 illustrates a cross-sectional schematic view of an opaque region of an electronic device in accordance with a first embodiment of the present disclosure.

FIG. 2 illustrates a cross-sectional schematic view of a button 108 in accordance with one embodiment of the present disclosure. The cross-section may be taken along line A-A in FIG. 1. Stack 200 includes a cover substrate 202, such as a cover glass or sapphire, on the top of the stack and a black color stack 204. A sensor 208 may be positioned at the bottom of the stack. (In some embodiments, the sensor may be separated from the stack 200 by an air gap.) The black color stack 204 includes a pigment stack 206 having a first dielectric layer 204A, a light absorbing layer 204B, and a second dielectric layer 204C. The pigment stack 206 can tune or adjust black color and help match the color under the button to the opaque region 104. The black color stack 204 also includes a non-conductive light-absorbing stack 210 having dielectric layers 204A interleaved with light absorbing layers 204B. The light absorbing layers absorb light to make the non-conductive light absorbing stack 210 darker, or more black in color. The light absorbing layers 204A may include tin layers, which can be non-conductive when the tin layers are kept very thin. The dielectric layers 204A further help ensure that the light absorbing stack 210 is non-conductive. The black color stack 204 has an optical density of approximately 3 or greater and absorbs all incident light. The black color stack 204 is also relatively thin (e.g., less than 2 microns) and non-conductive.

Figure 3:
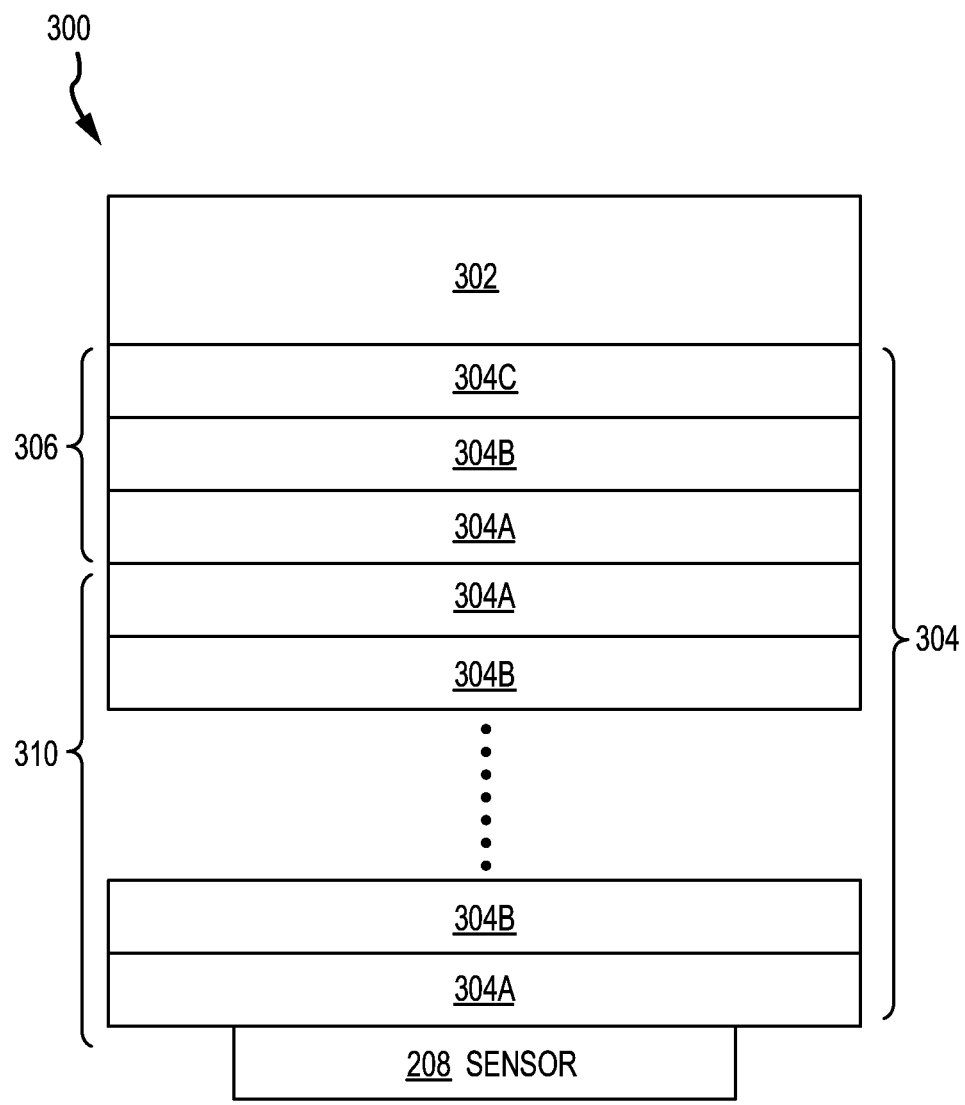
FIG. 3 illustrates a cross-sectional schematic view of an opaque region of an electronic device in accordance with a second embodiment of the present disclosure.

FIG. 3 illustrates a cross-sectional schematic view of opaque region 104 in accordance with a second embodiment of the present disclosure. Stack 300 includes the cover substrate 202 on the top and a black color stack 304 underneath the cover substrate. The black color stack 304 includes pigment stack 306 having a top dielectric layer 304C, a light absorbing layer 304B and a bottom dielectric layer 304A. The black color stack also includes a non-conductive light-absorbing stack 310 having dielectric layers 304A interleaved with light absorbing layers 304B.

The pigment stack 306 may reverse the positions of dielectric layers 204A and 204C of the pigment stack 206, as shown in FIG. 2, such that the top layer is dielectric layer 304C, which is different from the dielectric layer 304A used in the non-conductive light-absorbing stack 310. Stack 300 further includes a capacitive sensor 208 attached to the bottom of the black color stack 304.

Figure 4A:
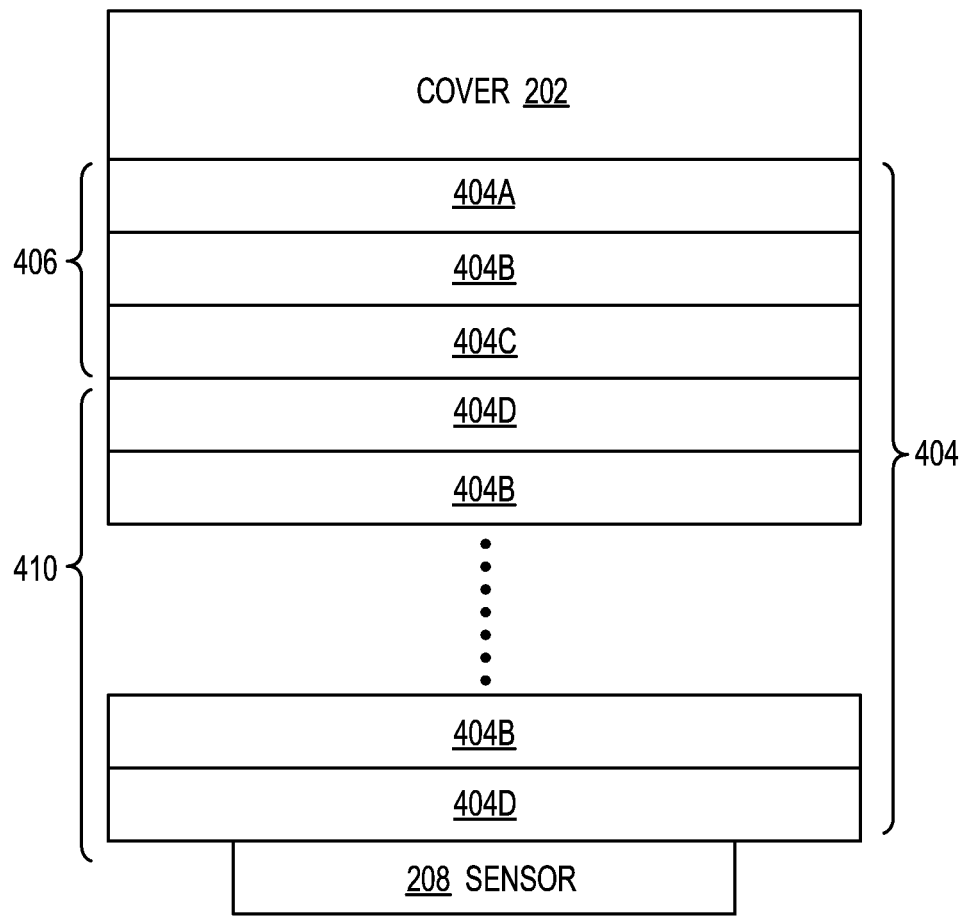
FIG. 4A illustrates a first cross-sectional schematic view of an opaque region of an electronic device in accordance with a third embodiment of the present disclosure.

FIG. 4A illustrates a cross-sectional schematic view of opaque region 104 in accordance with a third embodiment of the present disclosure. Stack 400 includes the cover substrate 202 on the top and a black color stack 404 underneath the cover substrate. The black color stack 404 includes a pigment stack 406 having a first dielectric layer 404A, a light absorbing layer 404B, and a second dielectric layer 404C. The black color stack 404 also includes a non-conductive light-absorbing stack 410 having dielectric layers 404D interleaved with light absorbing layers 404B. Note that the black color stack 406 may use a different dielectric layer 406D in the light-absorbing stack 410 from the pigment stack. This embodiment varies from stack 200. In contrast, stack 200 uses dielectric layer 204A in the light-absorbing stack 210, as shown in FIG. 2, where the dielectric 204A in the light-absorbing stack 210 is the same as one dielectric layer in the pigment stack 206. Stack 400 further includes a capacitive sensor 208 attached to the bottom of the black color stack 304. As previously mentioned, the pigment stack 406 may be colored black in order to match the black color of the stack 400, which is under the button 108, to the black ink color of the opaque region 104.

The light absorbing layers may include tin film having discontinuous grain structures, although in other embodiments a different metal or material may be used. Specifically, tin has high light absorption of visible wavelengths of light. By using thin and discontinuous grain structures in layers 204B and/or 304B, a black coating with high opacity and high resistivity may be achieved. The same is true with respect to employing tin in layer 404B, which may be interleaved with thick non-conductive or dielectric layers (e.g. $SiO_2$ layers).

Tin becomes non-conductive when the thickness of a tin layer is kept under about 100 nm. When the thickness of tin is below this threshold, the tin layer may include or be a discontinuous grain structure, thereby preventing the flow of electrical current. Tin has an electrical resistivity greater than $10^6$ Ωcm when the thickness of tin is less than 100 nm (for example, where a 40 nm thick tin layer is used).

By including intervening dielectric layers, the resistivity of the black color stack is significantly increased. For example, the electrical resistivity of tin is much lower than that of $Si_3N_4$ or $SiO_2$, and so the intervening dielectric layers may serve to increase the overall resistivity of the color stack. For example, $SiO_2$ generally has an electrical resistivity of $10^{16}$ Ωcm, which is slightly higher than the electrical resistivity of $10^{14}$ Ωcm for $Si_3N_4$, both of which exceed the resistivity of a thin tin layer. The intervening dielectric layers makes stack 410 non-conductive.

By increasing the number of layers in the black color stack, the optical density of the black color stack can be increased. As an example, one may use fewer layers to create a gray ink coating, such that the black color stack has a higher optical density than the gray ink coating.

In alternative embodiments, other materials may replace tin in the light absorption layers. For example, copper oxide (CuO) generally has good light absorption qualities and may form a non-conductive layer, or be used as part of a non-conductive layer. Zinc oxide (ZnO) may also be used as a light absorption layer and likewise has good resistivity.

The dielectric layers in the non-conductive light-absorbing stack and/or the pigment stack may include silicon nitride ($Si_3N_4$), silicon oxide ($SiO_2$), and niobium oxide ($Nb_2O_5$), among others. These materials have relatively low dielectric constants compared to black ink. Each of the layers in the black color stack may vary in thickness or multiple layers may have uniform thicknesses.

In one example, the top pigment stack may include a layer of silicon nitride over a layer of tin which overlays a layer of silicon oxide. The black color stack may include three layers in the pigment stack, and 18 tin layers interleaved with 19 silicon nitride layers in the light-absorbing stack. The black color stack may have a total thickness of 1.3 μm, generally does not affect the performance of standard capacitive sensors.

Figure 4B:
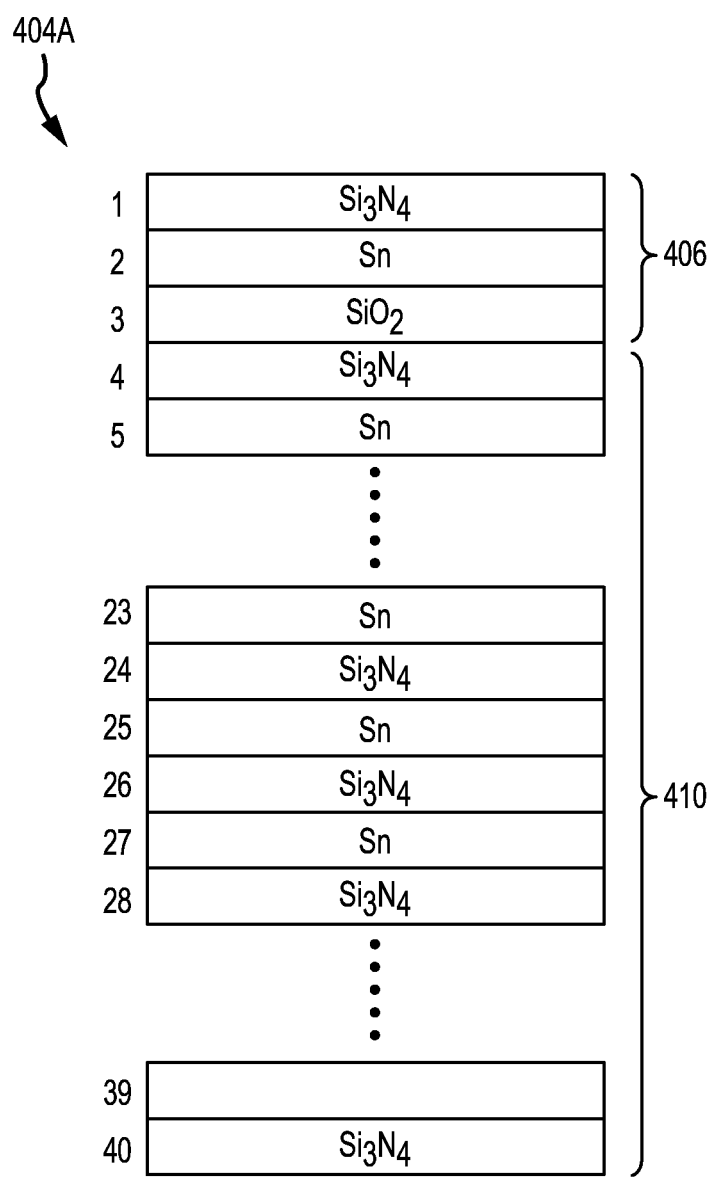
FIG. 4B shows a sample embodiment of a black color stack.

FIG. 4B shows a sample embodiment of a black color stack 200. As shown, the pigment stacks 206, 306, or 406 may include three layers, such as a first or top $Si_3N_4$ layer (which may be deposited directly on the cover glass 202), a second Sn layer, and a third $SiO_2$ layer. The light-absorbing stack 210/310/410 may include 19 layers of $Si_3N_4$ interleaved with 18 layers of tin, as shown in FIG. 4B. A bottom layer (which may be a $40^{th}$ layer) may include $Si_3N_4$. In some embodiments, the bottom layer may be adjacent to the capacitive sensor 208.

In some embodiments, each or some dielectric layer(s) (e.g. $Si_3N_4$) layer may have a different thickness than another (or all other) $Si_3N_4$ layer(s). For example, the 26th, 30th, 32nd, . . . , and 40th layers of $Si_3N_4$ may have a thickness of about 100 nm, while sixth, eighth, tenth . . . , and 24th layers of $Si_3N_4$ many have a thickness of about 30 nm. Continuing the example, the fourth layer of $Si_3N_4$ may have a thickness of 10 nm, while the first layer of $Si_3N_4$ may have a thickness of 40 nm, both of which may be different from the fourth layer or the other $Si_3N_4$ layers in the light-absorbing stack. In this embodiment, the tin layers each may have a thickness of about 5 nm. By varying the thicknesses of the dielectric layers, different wavelengths of light may be absorbed by each layer. In some embodiments, each of the tin layers may have substantially the same thickness.

Figure 5A:
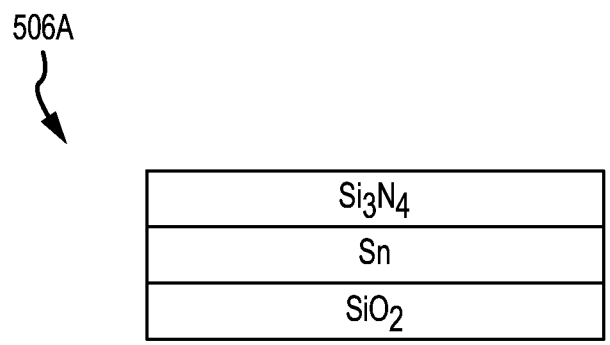
FIG. 5A illustrates a cross-sectional schematic view of sample layers of an opaque region of an electronic device, in accordance with various embodiments of the present disclosure.
Figure 5B:
FIG. 5B illustrates a cross-sectional schematic view of sample layers of an opaque region of an electronic device, in accordance with various embodiments of the present disclosure.
Figure 5C:
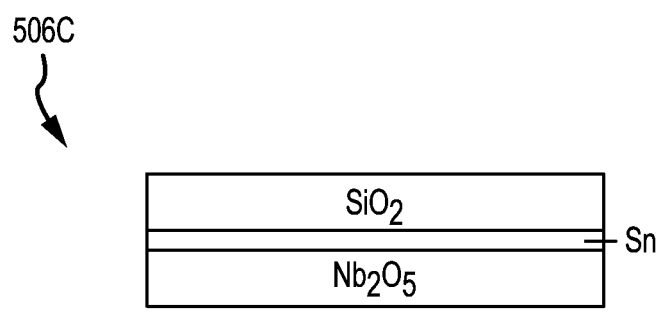
FIG. 5C illustrates a cross-sectional schematic view of sample layers of an opaque region of an electronic device, in accordance with various embodiments of the present disclosure.

Various embodiments of the pigment stack 406 are illustrated in FIGS. 5A-F. FIG. 5A a pigment stack 506A having $Si_3N_4$ and $SiO_2$ layers separated by a tin layer. FIG. 5B shows a pigment stack 506B having $Si_3N_4$ and $Nb_2O_5$ layers separated by a tin layer. FIG. 5C shows a pigment stack 506C having $SiO_2$ and $Nb_2O_5$ layers separated by a tin layer.

Figure 5D:
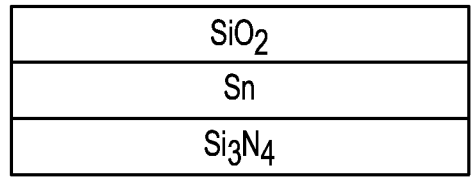
FIG. 5D illustrates a cross-sectional schematic view of sample layers of an opaque region of an electronic device, in accordance with various embodiments of the present disclosure.
Figure 5E:
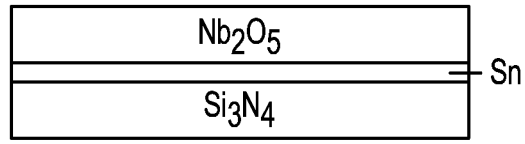
FIG. 5E illustrates a cross-sectional schematic view of sample layers of an opaque region of an electronic device, in accordance with various embodiments of the present disclosure.
Figure 5F:
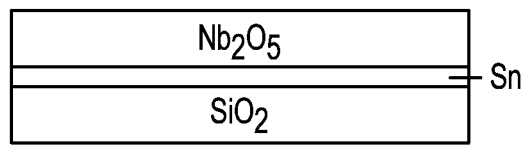
FIG. 5F illustrates a cross-sectional schematic view of sample layers of an opaque region of an electronic device, in accordance with various embodiments of the present disclosure.

It should be appreciated that the two dielectric layers of FIGS. 5A-C may switch positions. For example, FIG. 5D shows that pigment stack 506D may include $SiO_2$ on its top surface in an alternative to the embodiment of FIG. 5A. Similarly, FIG. 5E shows that pigment stack 506E may reverse the position of $Si_3N_4$ and $Nb_2O_5$, with $Nb_2O_5$ on the top surface, in an alternative to the embodiment of FIG. 5B. Further, FIG. 5F shows that pigment stack 506F may reverse the position of $SiO_2$ and $Nb_2O_5$ with $Nb_2O_5$ on the top surface, as compared to FIG. 5C. In some embodiments, Sn may be replaced by other light absorbing materials, such as CuO or ZnO. Also, $SiO_2$, $Nb_2O_5$ or $Si_3N_4$ may be replaced by other dielectric materials.

Each of $SiO_2$, $Si_3N_4$, and $Nb_2O_5$ has a lower or significantly lower dielectric constant than the dielectric constant of certain black inks For example, $SiO_2$ has a relatively low dielectric constant, about 3.9, compared to the dielectric constant of black ink. $SiO_2$ also has good light-diffusing properties with a refractive index of about 1.5.

Similarly, niobium oxide ($Nb_2O_5$) has a relatively low dielectric constant of about 42. $Nb_2O_5$ also has a refractive index of about 2.3. $Nb_2O_5$ is the most common and robust compound of niobium. Additionally, $Si_3N_4$ has a relatively low dielectric constant of about 7.5, and a refractive index of about 2.

Many embodiments may employ an inorganic dielectric, such as an oxide or nitride, with a relatively low dielectric constant. The dielectric layers may be deposited by vacuum technology to form very thin films. In some embodiments, a resin layer may be used.

In some embodiments, the thin opaque non-conductive black coating may be used for the entire opaque region 104 including button 108. Further, the color of the button may be matched to the color of the opaque region 104 (see FIG. 1). The opaque region 104, in contrast to the button 108 or other area overlying the sensor, may use conventional printing methods to form a relatively thicker black ink coating including carbon black as a pigment.

By contrast, the button 108 or other area overlying the sensor may use the thin, opaque, non-conductive black color stack 204, 304 or 404 having low dielectric constant, which may have less impact on the performance of the capacitive sensor. The pigment stack may also be used to impart a different color to button 108 as compared to the opaque region 104. The color coating under the button 108 may be matched to the color of the other opaque region 104, which may include black ink and is more conductive than the coating under button 108.

A cover glass 202 primarily formed from sapphire may be synthetic or natural, and in some embodiments may include various forms of alumina. Sapphire is a "hard" substrate material and is generally scratch resistant, and may be more scratch resistant than chemically treated glass In various embodiments, the button and/or the cover substrate may be flat, curved, circular, square, and/or rectangular. It will be appreciated by those skilled in the art that the button and/or cover substrate may vary in shape and/or dimension.

The operation of the capacitive sensor will now be briefly discussed. The capacitive sensor detects a change in capacitance when a user's appendage (or a suitable object, such as a stylus) approaches or touches the sensor. There is a fringe electric field that extends from the capacitive sensor 208 beyond the cover substrate 202. The electrical environment changes when the appendage enters the fringe field, with a portion of the electric field being shunted to ground instead of terminating at the capacitive sensor. As a result, the capacitance of the capacitive sensor 208 decreases, which can be detected.

Figure 6:
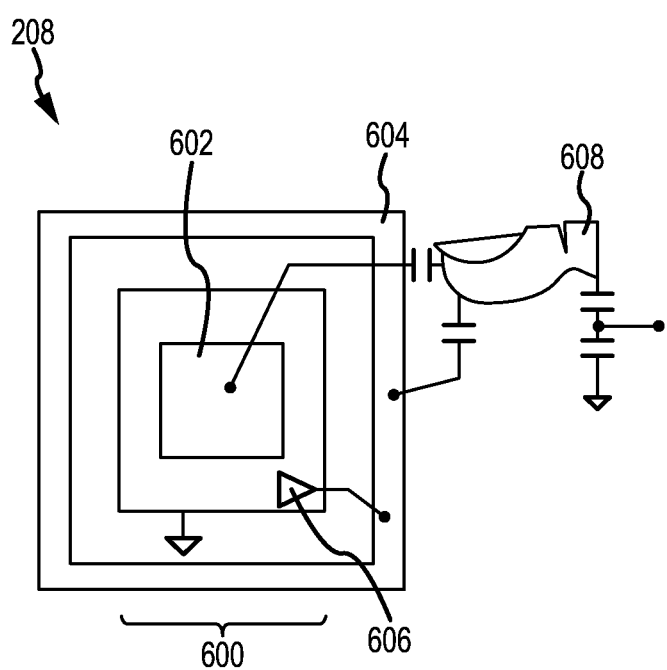
FIG. 6 is a schematic diagram illustrating a capacitive sensor for sensing a fingerprint or finger touch, in accordance with embodiments of the present disclosure.

FIG. 6 illustrates a diagram of a sample a capacitive sensor for sensing fingerprints and/or touch (or near-touch) in accordance with embodiments of the present disclosure. It should be appreciated that the capacitive sensor is meant as an example only; other sensors (whether capacitive or not) may be used in various embodiments. For example, pyroelectric sensors, ultrasonic sensors, optical sensors, swipe sensors, and the like may all be used with embodiments described herein. Accordingly, the sensor of FIG. 6 is but a single, non-limiting example and intended to provide context for certain embodiments described herein.

The capacitive sensor 208 may be used to provide secure access to sensitive electronic devices and/or data. As shown in FIG. 6, the capacitive sensor 208 may include both an array of capacitive sensing elements 602 and drive ring 604. The capacitive sensing element 602 may include data or other information with respect to a relatively small region of a fingerprint image. Generally, the capacitive sensor 208 may be used to determine an image of a fingerprint through measuring capacitance through each capacitive sensing element 602 of the capacitive sensor 208.

The voltage of the array of capacitive sensing elements 602 is not directly driven or modulated, but instead drive ring 604 is modulated by a drive amplifier 606. This modulation, in turn, excites finger 608 and the voltage and/or charge at each capacitive sensing element 602 varies as drive ring 604 is modulated since finger's 608 voltage changes with the modulation of drive ring 604.

For the capacitive sensor, the voltage applied to the drive ring 604 may be limited. Generally, the voltage is no more than a threshold of 4 volts (peak-to-peak). Any voltages above this threshold for exciting the finger 608 may be detected by a person as a "tingling" or uncomfortable feeling in his or her finger. Although the exact voltage at which one can sense the tingling may vary from person to person, the 4 volt peak-to-peak voltage is generally considered as the threshold beyond which the uncomfortable feeling is noticeable.

Since the voltage of the drive ring may be restricted to avoid user perception, the thickness of any dielectric overlaying the sensor is limited. Generally, the capacitance between the sensor 208 and finger 608 decreases with increased spacing between the sensor and finger or the thickness of the dielectric layer or stack between the sensor and finger. For example, when the finger is away from the sensor 208, a lower capacitance may be generated between the sensor and finger, and thus lower voltage signals are produced on underlying capacitive sensing elements 602. By contrast, when the finger is closer to the sensor 208, a higher capacitance may be generated between the sensor and finger, and thus higher voltage signals are produced on underlying capacitive sensing elements. With reduced capacitance, the fingerprint image may become blurry. As discussed above, by using the thin opaque non-conductive black color stack with low dielectric constant, the performance of the sensor may be improved insofar as the material between the sensor and finger (or other sensed object) may provide less electrical insulation therebetween.

In embodiments of the present disclosure, the black color stack may be fabricated by a deposition method, such as physical vapor deposition, chemical vapor deposition, ion beam deposition, or sputter deposition, among others.

Figure 7:
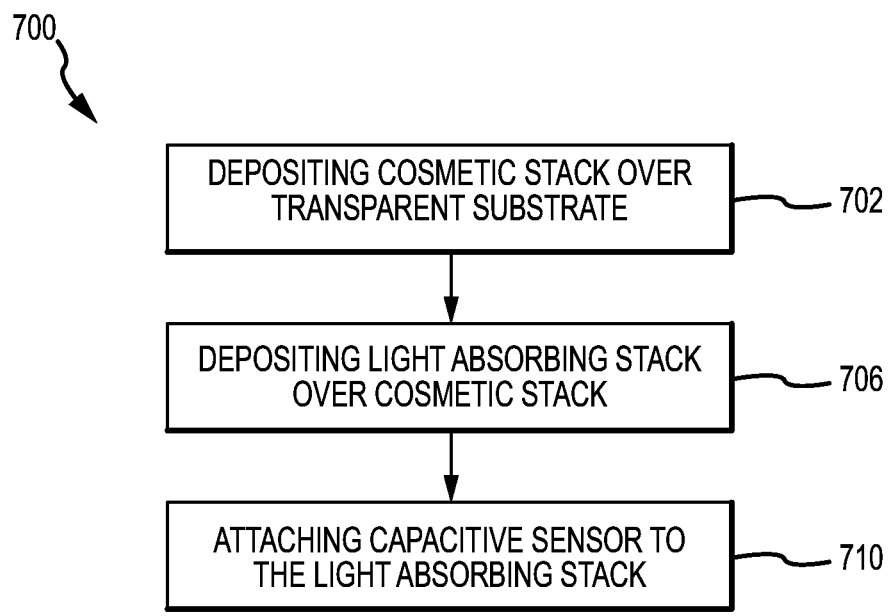
FIG. 7 is a flow chart illustrating steps for fabricating a display cover in accordance with embodiments of the present disclosure.

FIG. 7 is a flow chart illustrating steps for fabricating a display cover, including a black color stack and a sensor positioned adjacent the black color stack, in accordance with embodiments of the present disclosure. Method 700 starts with depositing a cosmetic coating stack on at least one portion of a transparent cover substrate 202, such as button 108 (which may be outside the action region of the display 102), at block 702. The transparent cover substrate 202 may be formed of glass or sapphire.

Method 700 continues with depositing a light-absorbing stack over the pigment stack at block 706. The deposition method may include, but is not limited to, physical vapor deposition (PVD), chemical vapor deposition (CVD), plasma enhanced chemical vapor deposition (PECVD), and/or ion beam assisted deposition (IBAD), among others. Method 700 further includes attaching a capacitive sensor 208 to an opposite side of the black color stack to the transparent cover substrate at block 710.

Various techniques are discussed below for forming a black ink coating on or in opaque regions 104. In these opaque regions, the black ink coating may be less insulating than the black color stack formed by method 700.

A black ink coating may be applied to a glass substrate, for example, in opaque region 104. This black ink coating does not include the button 108. For the button 108, black color stack is used instead. The black ink coating include black ink, such as carbon black.

In one embodiment, a silk screen is used. The silk screen includes a woven mesh that transfers ink or printable materials onto a substrate. A fill blade or squeegee is moved across the silk screen, forcing the ink into the openings of the woven mesh to transfer by capillary action during a squeegee stroke. The silk screen method may have issue with coating thickness uniformity due to the mesh. For example, it may generate about 1 µm height difference which may affect the performance of the capacitor sensor 208.

In another embodiment, a slit coating process may be used. Slit coating is a process that creates an uninterrupted curtain of fluid that falls onto a substrate. The substrate is transported on a conveyor belt at a constant speed through the curtain to ensure an even coat on the substrate. The curtain is created by using a slit at the base of a holding tank, such as a metal block, allowing the liquid to fall upon the substrate.

Figure 8:
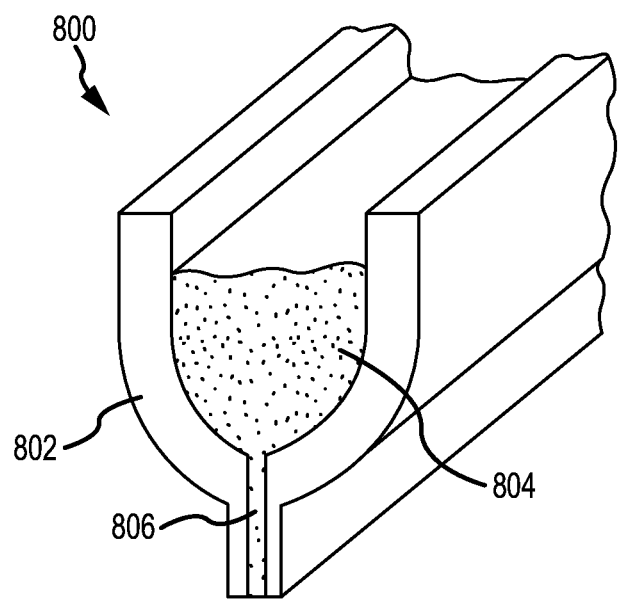
FIG. 8 is a simplified diagram of a metal block in accordance with embodiments of the present disclosure.

FIG. 8 illustrates a metal block in accordance with embodiments of the present disclosure. As shown, a metal block 802 may include a reservoir material 804, such as black ink, in liquid form. The metal block 802 also includes a slit 806 at the bottom. The slit 806 allows black ink 804 to pass through to form a coating on a moving substrate. This slit coating method may have fabrication concerns including voids, surface condition, and homogeneity etc.

In a further embodiment, a heat transfer method may be used. Specifically, the heat transfer method uses a carrier film to roll black ink onto the carrier film, and applies the black ink to a glass or sapphire substrate by heating, followed by peeling off the carrier film from the glass or sapphire substrate.

Figure 9:
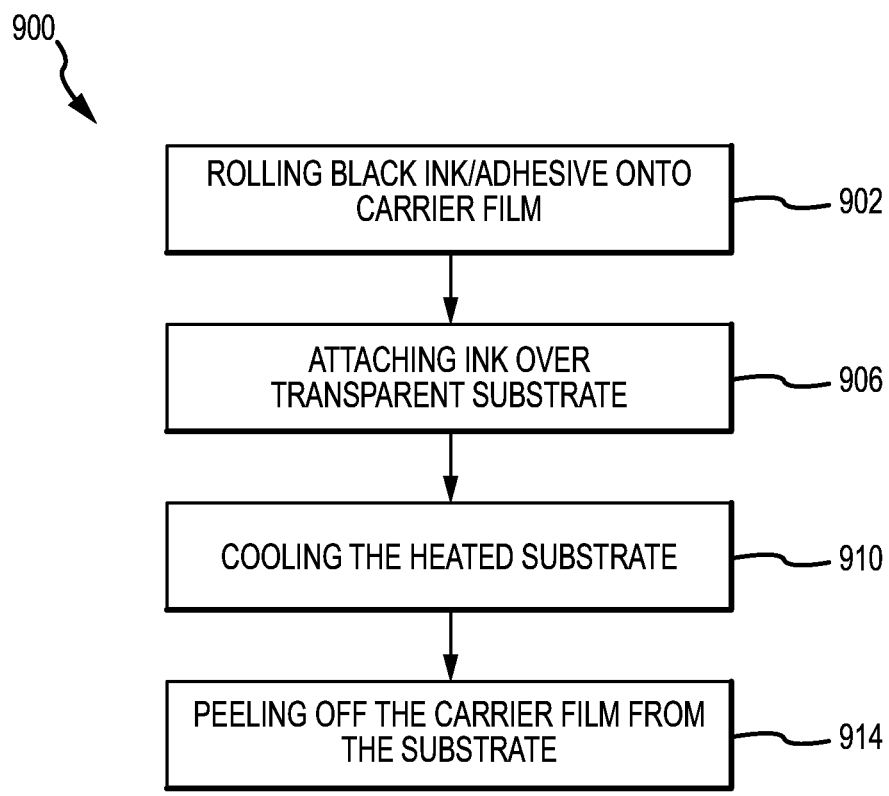
FIG. 9 is a flow chart illustrating steps for applying a black ink layer to a substrate in accordance with embodiments of the present disclosure.

FIG. 9 is a flow chart illustrating steps for applying a black ink layer to a substrate or coated substrate in accordance with embodiments of the present disclosure. Method 900 may start with rolling a black ink sublayer onto a carrier film, which may be a flexible polymer film, such as polyethylene(terephthalate) (PET) film, at block 902. Method 900 may also include attaching the carrier film with the black ink layer including adhesives to a glass or sapphire substrate 202 at block 906. For example, the black ink or pigments may be embedded within the adhesives. Method 900 may further include heating the substrate and carrier film and applying pressure on the carrier film against the substrate 202 at block 910, such that the black ink layer adheres to the substrate 202. Method 900 may continue with cooling the substrate and carrier film to form a coated substrate and peeling off the carrier film from the coated substrate at block 914.

Figure 10:
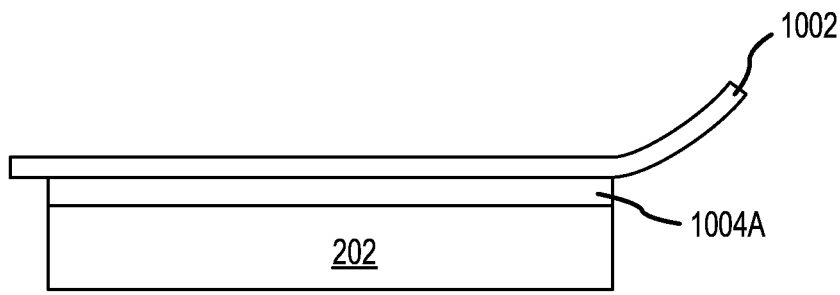
FIG. 10 shows application of a black ink layer to a substrate in accordance with embodiments of the present disclosure.

FIG. 10 shows a stack of a carrier film 1002, a first black ink/adhesive sublayer 404A, and a glass or sapphire substrate 202 in accordance with embodiments of the present disclosure. An additional black ink layer may be applied to the coated glass substrate by repeating the method disclosed above for the first black ink layer. This method may provide substantially homogeneous and uniform opaque thin film.

In yet still another embodiment, spin coating is a procedure that is used to deposit uniform thin films to flat substrates. Generally, a small amount of coating material is applied on the center of the substrate. The substrate is then rotated at high speed in order to spread the coating material by centrifugal force. This spin coating method may create thin films with thicknesses below 10 nm. Therefore, more black ink layers may be deposited to form a black coating, which is different from the stack as shown in FIGS. 2-5.

Processes for depositing a black color stack will now be discussed. For button 106, black color stack is used to make the underneath sensor 208 invisible. The various layers of the black color stack 204, 304, 404 discussed herein may be formed over the substrate 202 in a variety of manners. For example, the technologies may include PVD, CVD, PECVD, and/or IBAD, each producing a slightly different structure to the layer. The different structure may affect electrical properties, optical properties of the mirror stack. The deposition of coating materials varies by process, with the specific conditions, including the atmosphere, the temperature of the substrate and chamber, the pressure, presence, ratio, type and energy of additional energetic ions, the deposition rate and the condition of the coating materials, all contributing to the final structure, composition and density that can affect the various material properties.

Figure 11:
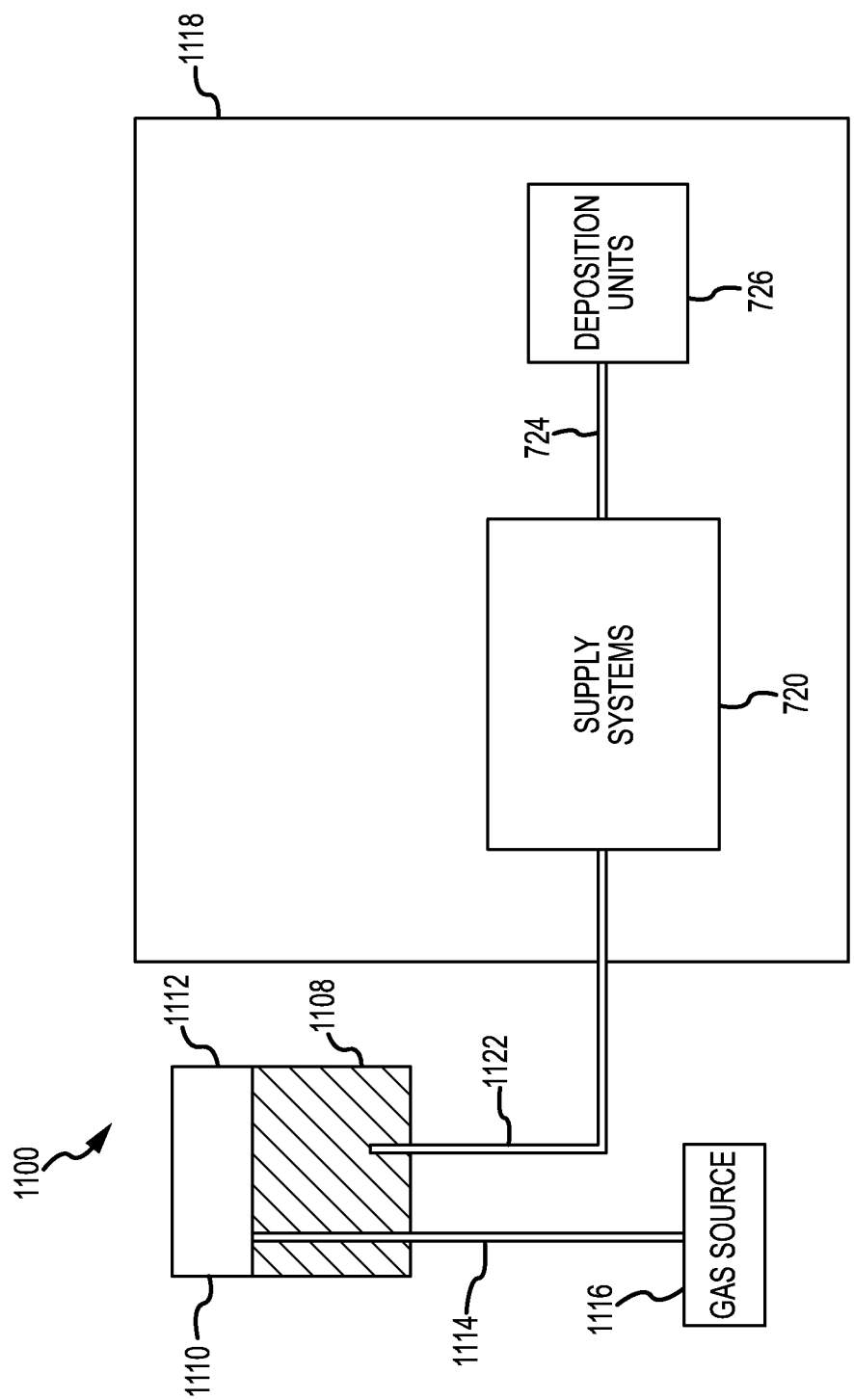
FIG. 11 is a simplified system diagram for a sample deposition system.

FIG. 11 is a simplified system diagram for deposition system including PVD in according with embodiments of the present disclosure. A deposition system 1100 may apply a surface treatment to the substrate 202. In this particular example, deposition system 1100 includes one or more reservoirs 1110 for various coating materials 1108 (e.g., $SiO_2$, $Si_3N_4$, Sn, and $Nb_2O_5$). An inert gas 1112 (e.g., argon or nitrogen) may be supplied by gas source 1116 through purge or pressurization flow pipe 1114, in order to reduce oxidation, wetting and contamination within reservoirs 1110. Depending on design, reservoirs 1110 may be coupled to vacuum chamber 1118 by one or more delivery tubes 1122, as configured to deliver materials 1108 from reservoirs 1110 to supply systems 1120. Supply systems 1120 utilize a suitable combination of tubes, pumps, valves and other components to direct materials 1108 into vaporizing or deposition units 1126 for deposition onto substrate 202, as shown in FIG. 2. In the particular configuration of FIG. 11, deposition units 1126 are provided in the form CVD or PVD components. Alternatively, other processes and components may be utilized, for example, to treat substrate 202 by sputtering, electron beam deposition or electron beam evaporation, MAD, PECVD or a combination of such processes.

In some embodiments, deposition system 1100 also controls pressure, temperature and humidity to operate chamber 1118 as a vacuum chamber or other chemical or physical vapor deposition environment. Deposition system 1100 may also maintain a particular temperature for the surface coating process, for example, between about 100° C. and about 150° C., or between about 100° C. and about 170° C. Air may also be provided within chamber 1118, either during or after the coating process, in order to expose substrate 202 to atmosphere in a controlled process, before removal from chamber 1118.

In general, supply systems 1120 and deposition units 1126 are controlled to deposit selected amounts of material (e.g., $SiO_2$, Sn, and $Nb_2O_5$) onto substrate 202 in particular orders and combinations.

Having described several embodiments, it will be recognized by those skilled in the art that various modifications, alternative constructions, and equivalents may be used without departing from the spirit of the disclosure. Additionally, a number of well-known processes and elements have not been described in order to avoid unnecessarily obscuring the embodiments disclosed herein. Accordingly, the above description should not be taken as limiting the scope of the document. For example, although embodiments herein have been discussed in the context of an electronic device, the color stack, methods, and other embodiments described herein may be used with substantially any product or on substantially any surface.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. An electronic device, comprising:
   a capacitive sensor;
   a transparent substrate; and
   a black color stack disposed on the transparent substrate, wherein the black color stack absorbs all incident light and completely overlaps the capacitive sensor, wherein capacitive coupling occurs through the black color stack when the capacitive sensor receives touch input, and wherein the black color stack comprises:
      a pigment stack comprising:
         a first dielectric layer comprising a first material;
         a second dielectric layer comprising a second material different from the first material; and
         a first light absorption layer comprising an absorbing material positioned between the first and second dielectric layers, wherein:
            the first dielectric layer has a first refractive index; and
            the second dielectric layer has a second refractive index different from the first refractive index; and
      a plurality of second light absorption layers interleaved with a plurality of third dielectric layers; wherein:
         the second light absorption layers comprise the absorbing material; and
         the third dielectric layers comprise the first material.

2. The electronic device of claim 1, wherein the first dielectric layer and the second dielectric layer comprise a material selected from a group consisting of silicon oxide, silicon nitride, and niobium oxide.

3. The electronic device of claim 1, wherein the black color stack has an electrical resistivity of at least $10^{14}$ Ωcm or greater.

4. The electronic device of claim 1, wherein the black color stack has an optical density of at least 3 or greater.

5. The electronic device of claim 1, wherein each of the first, second, and third dielectric layers has a dielectric constant lower than a threshold and wherein the threshold of the dielectric constant is 50.

6. The electronic device of claim 1 wherein each of the first and second light absorption layers comprises a material selected from a group consisting of tin, copper oxide, and zinc oxide.

7. The electronic device of claim 1, wherein:
   the first light absorption layer is formed from tin;
   the first light absorption layer has a thickness equal to or less than 100 nm such that the first light absorption layer is non-conductive.

8. The electronic device of claim 7, wherein the tin layer has a thickness of about 5 nm.

9. The electronic device of claim 1, wherein each of the first, second, and third dielectric layers has a thickness ranging from 10 nm to 100 nm.

10. The electronic device of claim 1, wherein the transparent substrate comprises sapphire or glass.

11. The electronic device of claim 1, wherein the black color stack has a thickness ranging from 1 μm to 2 μm.

12. The electronic device of claim 1, wherein the sensor is positioned adjacent the black color stack such that the sensor is concealed from view, by the black color stack, from a top of the transparent substrate.

13. A method for forming a black color stack over a capacitive sensor, wherein the black color stack absorbs all incident light, the method comprising:
depositing a pigment stack on a transparent substrate, comprising:
depositing, on the substrate, a first dielectric layer comprising a first material having a first refractive index;
depositing, on the first dielectric layer, a first light absorption layer comprising an absorbing material;
depositing, on the first light absorption layer, a second dielectric layer comprising a second material different from the first material and having a second refractive index different from the first refractive index; and
depositing a non-conductive light-absorbing stack on the pigment stack, comprising interleaving a plurality of second light absorption layers with a plurality of third dielectric layers, wherein the second light absorption layers comprise the absorbing material and the third dielectric layers comprise the first material; and
positioning the capacitive sensor adjacent to the light-absorbing stack, wherein capacitive coupling occurs through the black color stack when the capacitive sensor receives touch input and wherein the black color stack completely overlaps the capacitive sensor.

14. The method of claim 13, wherein the non-conductive light-absorbing stack has a thickness ranging from 1 μm to 2 μm.

15. The method of claim 13, wherein depositing the pigment stack on the transparent substrate includes a process selected from a group consisting of physical vapor deposition (PVD), chemical vapor deposition (CVD), plasma enhanced chemical vapor deposition (PECVD), and ion beam assisted deposition (BAD).

16. The method of claim 13, wherein the first dielectric layer and the second dielectric layer comprise a material selected from a group consisting of silicon oxide, silicon nitride, and niobium oxide.

17. The method of claim 13, wherein the first light absorption layer comprises a material selected from a group consisting of tin, copper oxide, and zinc oxide.

18. The method of claim 13, wherein:
the first light absorption layer is formed from tin;
the first light absorption layer has a thickness equal to or less than 100 nm such that the first light absorption layer is non-conductive.

19. The method of claim 13, wherein the non-conductive light-absorbing stack comprises a stack of eighteen tin layers interleaved with nineteen silicon nitride layers.

20. The method of claim 13, wherein the pigment stack has a thickness equal to or less than 100 nm.

21. The method of claim 13, wherein the transparent substrate comprises sapphire or glass.

22. The method of claim 13, wherein the black color stack has an optical density of at least 3 or greater.

23. A button assembly, comprising:
a transparent substrate;
a non-conductive color stack disposed on the transparent substrate and having at least 20 layers occupying a combined thickness less than about 2 μm, wherein the non-conductive color stack absorbs all incident light, the non-conductive color stack comprising:
a pigment stack comprising:
a first dielectric layer;
a second dielectric layer having a refractive index different from the first dielectric layer; and
a first light absorbing layer positioned between the first and second dielectric layers; and
a light absorbing stack comprising a plurality of third dielectric layers interleaved with a plurality of second light absorbing layer; and
a capacitive sensor below the non-conductive color stack, wherein capacitive coupling occurs through the non-conductive color stack when the capacitive sensor receives touch input and wherein the non-conductive color stack completely overlaps the capacitive sensor.

24. The button assembly of claim 23, wherein the first light absorbing layer and the plurality of second light absorbing layers comprise a same material.

25. The button assembly of claim 23, wherein each of the second light absorbing layers is about 5 nm thick.

26. The button assembly of claim 23, wherein the plurality of third dielectric layers comprise a material different from the second dielectric layer.

27. The button assembly of claim 23, wherein the plurality of third dielectric layers interleaved with the plurality of second light absorbing layers comprises:
nineteen third dielectric layers; and
eighteen second light absorbing layers.

28. The button assembly of claim 27, wherein:
the first dielectric layer and the plurality of third dielectric layers comprise silicon nitride;
the second dielectric layer comprises silicon oxide; and
the first light absorbing layer and the plurality of second light absorbing layers comprise tin.

* * * * *